May 21, 1957   A. D. MAST   2,792,898
OCCUPANT-CONTROLLED LAWN MOWER RIDING ASSEMBLY
Filed Feb. 8, 1954   3 Sheets-Sheet 1
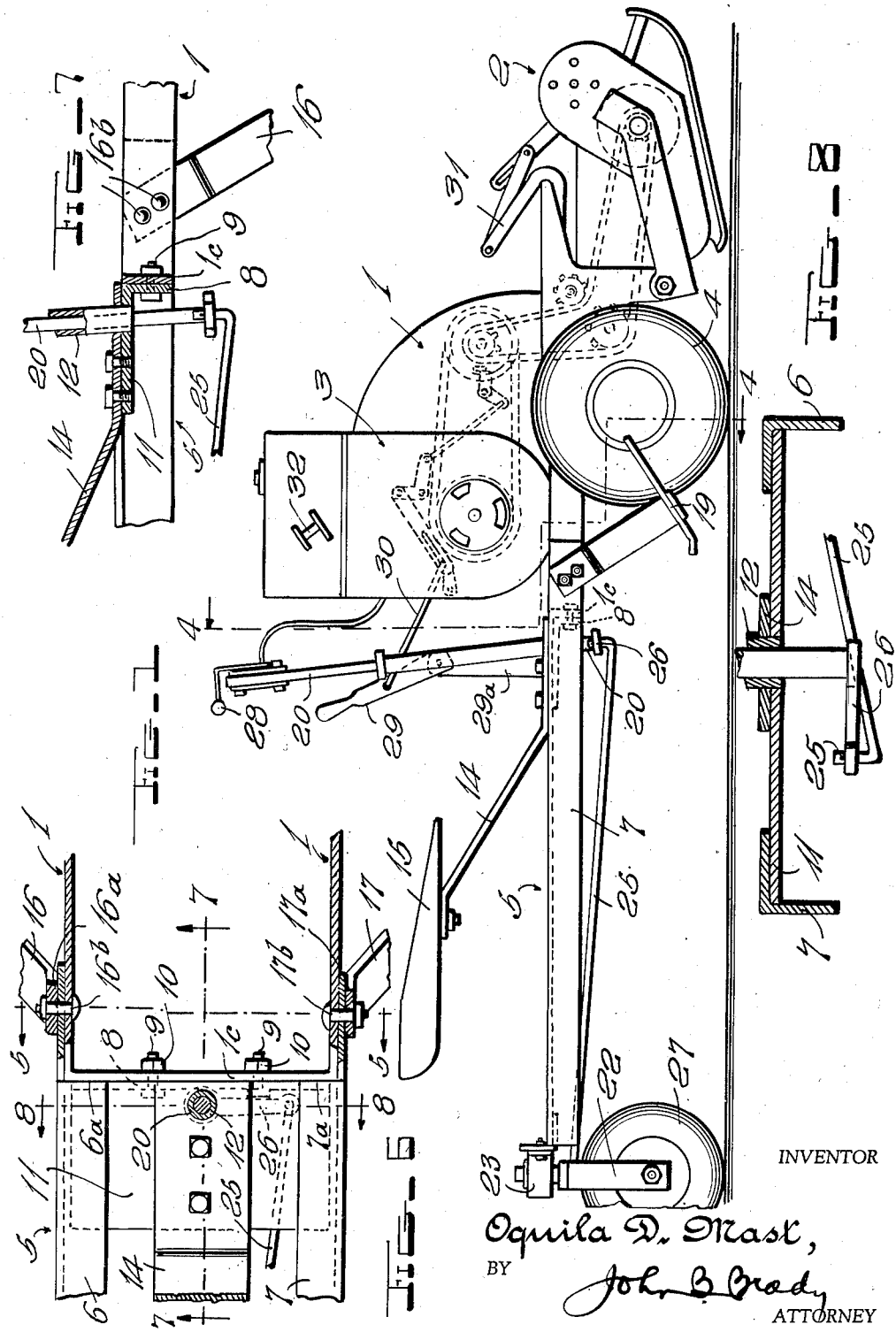
INVENTOR
Aquila D. Mast,
BY John B. Brady
ATTORNEY May 21, 1957    A. D. MAST    2,792,898
OCCUPANT-CONTROLLED LAWN MOWER RIDING ASSEMBLY
Filed Feb. 8, 1954    3 Sheets-Sheet 2
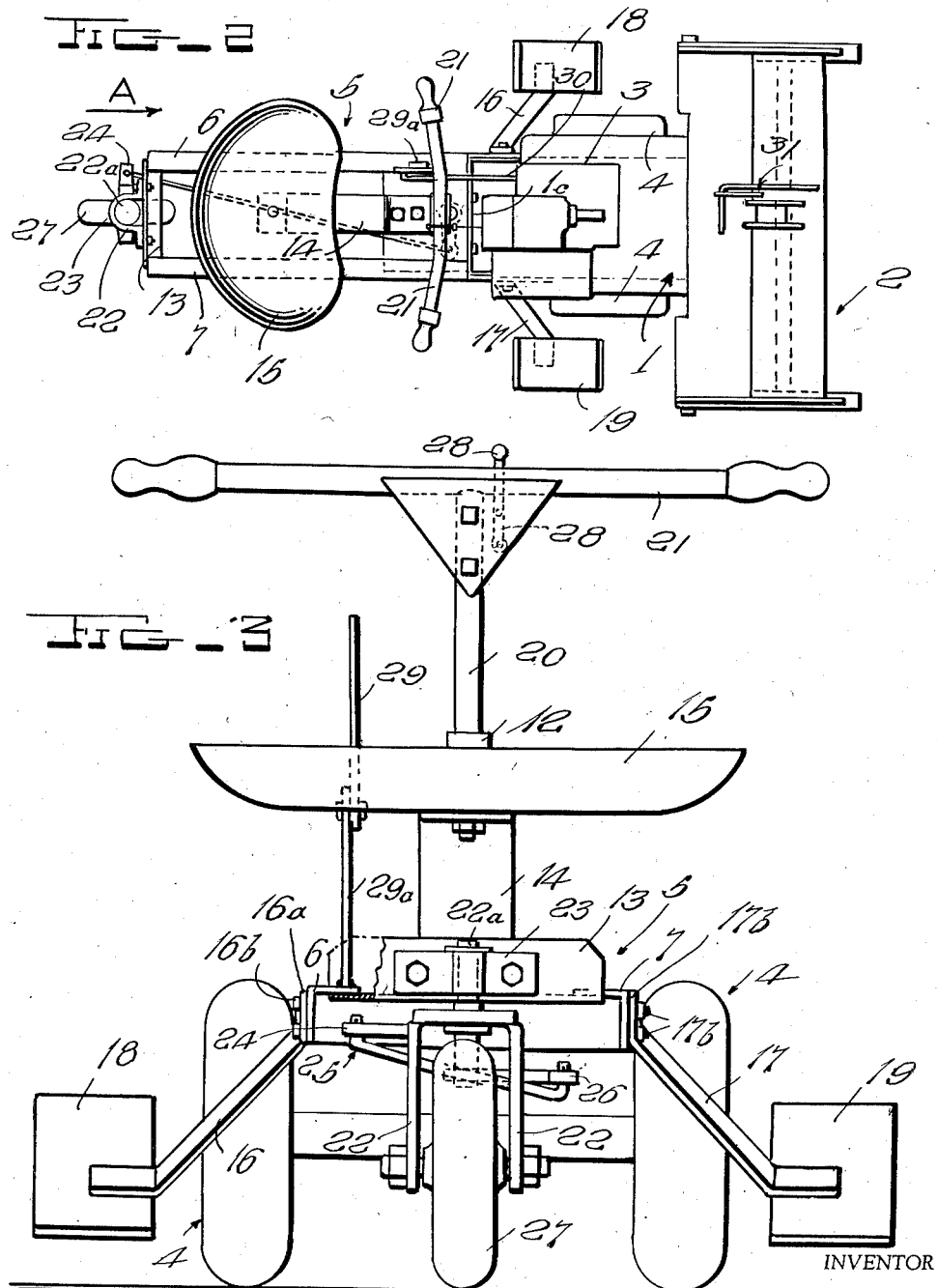
INVENTOR
Aquila D. Mast,
BY John B. Brady
ATTORNEY

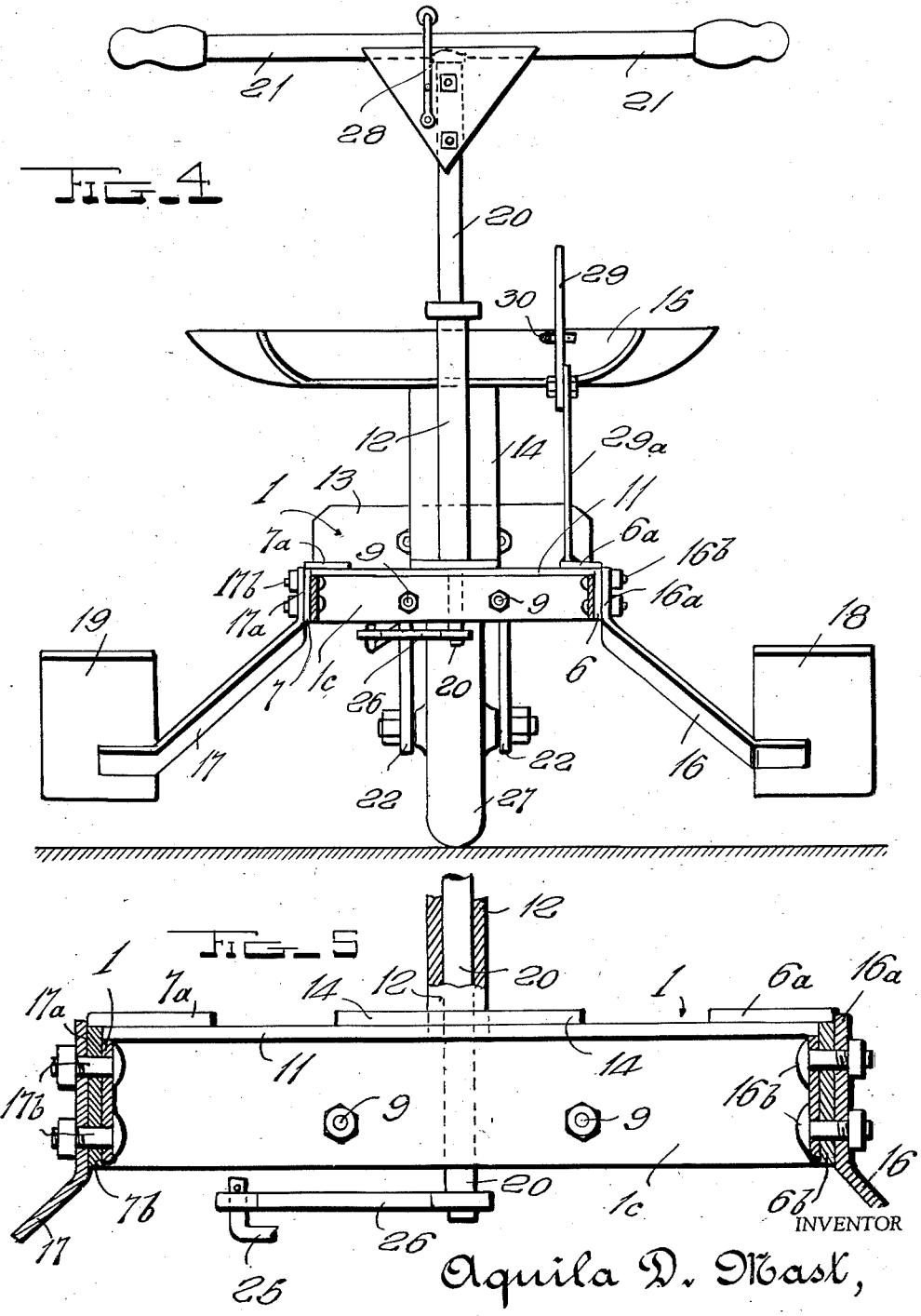

United States Patent Office 2,792,898
Patented May 21, 1957

2,792,898

OCCUPANT-CONTROLLED LAWN MOWER RIDING ASSEMBLY

Aquila D. Mast, Lancaster, Pa.

Application February 8, 1954, Serial No. 408,788

2 Claims. (Cl. 180—11)

My invention relates broadly to lawn mowers, and more particularly to an occupant-steered riding-type of power-driven lawn mower.

One of the objects of my invention is to provide a construction of occupant-steered power-driven riding-type of lawn mower.

Another object of my invention is to provide a power-driven lawn mower comprising a combination of a cutter unit wheeled-chassis and a riding unit wheeled-chassis with means coupling the two chassis and providing supports for foot rests which straddle the chassis for the convenience of the operator seated upon the riding unit wheeled-chassis.

Still another object of my invention is to provide an assembly of units for a power-driven, occupant-steered riding-type lawn mower in which unitary means are provided for intercoupling parts of the assembly together with foot rest brackets, forming part of the occupant seating arrangement on the chassis.

Still another object of my invention is to provide an arrangement of occupant riding single-wheeled steering unit which may be readily coupled with a two-wheeled lawn mower unit for enabling an operator in seated position to maneuver the lawn mower in a readily controllable course.

Still another object of my invention is to provide a three-wheeled lawn mower assembly of the riding-type which may be steered and maneuvered from a rearward position of the lawn mower assembly and the engine of the lawn mower assembly employed for driving the three-wheeled lawn mower assembly.

Other and further objects of my invention reside in the manner of assembling the power and steering controls of a power-operated lawn mower on the front of a riding unit which is coupled with the rear of a lawn mower unit in such manner that the units operate in tandem relation with the operator in convenient seated position behind the power-operated lawn mower as set forth in the specification hereinafter following by reference to the accompanying drawings, in which:

Figure 1 is a side elevational view of the power-operated lawn mower and riding unit of my invention with the lawn mower elevated for purposes of transporation;

Fig. 2 is a top plan view of the riding unit and lawn mower of my invention;

Fig. 3 is a rear elevational view of the lawn mower and riding unit assembly on an enlarged scale, looking in the direction of arrow A in Fig. 2;

Fig. 4 is a vertical sectional view taken substantially on line 4—4 of Fig. 1;

Fig. 5 is an enlarged transverse sectional view taken substantially on line 5—5 of Fig. 6 and showing on an enlarged scale the manner of coupling the riding unit chassis, the lawn mower unit chassis, and the foot rest brackets;

Fig. 6 is a fragmentary plan view partially in horizontal section showing the manner of coupling the cutter unit wheeled-chassis and the riding unit wheeled-chassis;

Fig. 7 is a fragmentary longitudinal sectional view taken substantially on line 7—7 of Fig. 6; and Fig. 8 is a transverse sectional view taken substantially on line 8—8 of Fig. 6.

My invention is directed to an occupant-steered riding-type of lawn mower which includes a cutter unit wheeled-chassis and a riding unit wheeled-chassis which may be linearly coupled, one with respect to the other, by securing means which also provide mounting means for the foot rest brackets. The two chassis when thus coupled in tandem have a low center of gravity so that when the weight of the operator is added to the riding unit the danger of tilting or tipping over during the operation of the lawn mower is reduced to a minimum. The cutter unit chassis is mounted on a two-wheel assembly while the riding unit chassis, which is coupled at its forward end with the rearwardly extending end of the cutter unit chassis, is supported by a single-wheel at the rear thereof, the single-wheel being orientatable from a steering mechanism arranged at the front of the riding unit. The steering mechanism on the riding unit is associated with controls which extend from the driving engine whereby the operator, on the riding unit, in seated position may control the speed of the driving engine. While I have shown the riding unit and cutter unit assembly of my invention in one of its preferred embodiments, I desire that it be understood that the disclosure herein is to be considered in the illustrative sense and not in the limiting sense.

Referring to the drawings in more detail, reference character 1 designates the cutter unit wheeled-chassis carrying the cutter unit 2 adjustably mounted at the front thereof and the gasoline engine 3 supported adjacent the rear thereof. The driving engine is a conventional gasoline engine having controls extending rearwardly and mounted on the riding unit chassis 5 in a position convenient to the operator when seated on the riding unit chassis. The cutter unit chassis is supported on a two-wheel assembly indicated at 4 with the chassis located between the wheeled assembly.

The riding unit wheeled-chassis 5 includes a pair of linearly extending substantially parallel angles 6 and 7 facing inwardly toward each other with the top portions of the angles cut away at 6a and 7a and the side portions of the angles extending beyond the top portion 6a and 7a, as represented at 6b and 7b, shown more clearly in Fig. 5. A bar 8 extends between the sides of the linearly extending angle members 6 and 7 immediately below the terminating ends 6a and 7a at the tops thereof. The rear ends of the angle members 6 and 7 are spaced by an angle member 13 which serves as a support for the bracket 23, forming a bearing for the upwardly extending pintle 22a of the steering yoke 22 in which the wheel 27 is journalized.

The cutter unit chassis 1 terminates at its rear end in a transversely extending bar 1c which is adapted to establish abutting contact with the bar 8 when the cutter unit chassis 1 is telescopically moved to a position between the extensions 6b and 7b of the riding unit chassis and immediately below the top edges 6a and 7a of the angles 6 and 7. Bolts and nuts 9 and 10 provide securing means for the end bar 1c of the cutter unit chassis 1 and the front bar 8 of the riding unit chassis 5, as shown more particularly in Fig. 6. A transversely extending support plate 11 is fastened beneath the tops of the angles 6 and 7 extending from a position immediately behind transverse bar 8 and provides mounting means for the upwardly inclined steering journal 12 and the spring seat support 14 which extends longitudinally between angles 6 and 7 from a position secured to the top of support plate 11 in an upward direction where it supports the operator's seat 15.

I provide a pair of foot rest brackets 16 and 17 extending upwardly on opposite sides of the cutter unit wheeled-chassis and terminating in vertically extending flat faces 16a and 17a abutting with the outside faces of the angle members 6 and 7 and having bolt hole apertures therein at a position aligned with bolt holes provided in the forwardly projecting extensions 6b and 7b on the riding unit chassis 5 and aligned with bolt holes formed in the cutter unit chassis 1 as shown more clearly in Fig. 5, through all of which bolt holes and bolt hole apertures the securing bolts 16b and 17b extend.

The fastening bolts 16b and 17b thus provide coupling means for all three members, that is, the cutter unit chassis; the riding unit chassis; and the foot rest brackets 16 and 17. The foot rest brackets 16 and 17 terminate in foot rests shown at 18 and 19 for the comfort of the driving operator seated in seat 15.

A steering post 20 is journalled in the sleeve constituted by the steering journal 12. There is a steering arm 26 extending from steering post 20 and connected through link 25 with the steering arm 24 on the yoke 22 of the single-wheel 27 at the rear of riding unit chassis 5. In lieu of the single-wheel 27 I may provide a pair of wheels or a roller in this position. The steering post 20 journaled in steering journal 12, as shown more particularly in Fig. 8, is controlled by handle bars 15 in a position convenient to the operator seated in seat 15. The throttle control lever 28 is carried by handle bars 21 and steering post 20 and is connected with the carbureter of engine 3. A control lever 29, pivoted on post 29a secured to the forward portion of angle member 6, is connected through link 30 to operate the clutch between engine 3, the cutter unit 2, and the ground traction wheels 4. There is also provided, convenient to the operator, an orientation control mechanism 32 on engine 3. Thus all controls are located on the riding unit chassis 5 and connected with the mechanism on the cutter unit chassis 1. The operation of the riding unit is comfortable and efficient and so simple that a child can operate the lawn mower with considerable enjoyment as a riding device. The rear single steering wheel operating in coaction with the two front wheels 4 and controllable by swinging the handle bars 21 has proven very effective in turning the lawn mower through extremely short angles in cutting around shrubbery and immediately adjacent a wall, house, or other obstruction.

The coupling of the two chassis through the same means which form the support for the foot rest brackets has proven to be a most practical and economical assembly method.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A riding unit for occupant-controlled lawn mowers comprising a pair of spaced angle members having top flanges directed toward each other in coplanar arrangement and side flanges extending linearly in substantially parallel arrangement, a transversely disposed angle member having a horizontal and vertical flange with the horizontal flange thereof secured beneath the top flanges of the rear ends of said linearly extending spaced angle members, a journal supported by the vertical flange of said transversely disposed angle member, a swivel wheel mounted in said journal on a vertical axis in a position behind the terminating ends of said linearly extending spaced angle members, a transverse plate located adjacent the front of said angle members, a steering journal supported by said transverse plate, a seat support mounted on said transverse plate and extending to a position above said angle members, and steering means mounted in said steering journal and connected with said swivel wheel for selectively orienting said swivel wheel.

2. An occupant-controlled riding-type lawn mower comprising a cutter unit wheeled-chassis, a riding unit wheeled-chassis of substantially the same width, a transverse member extending across the rear of said cutter unit wheeled-chassis, a separate transverse member extending across the front of said riding unit wheeled-chassis, said transverse members abutting in surface contact with each other when said chassis are longitudinally aligned in coplanar relation, means intercoupling said transverse members, side members formed on one of said chassis and extending in overlapping relation with the sides of the other of said chassis, foot brackets extending at an acute angle to the plane of said cutter unit wheeled-chassis when aligned with each other in coplanar relation and projecting downwardly and outwardly in opposite directions beyond the transverse limits of said cutter unit wheeled-chassis from said riding unit wheeled-chassis toward and under said cutter unit wheeled-chassis, and means intercoupling said foot brackets and each of said chassis for maintaining said chassis in coplanar alignment with said foot brackets extending below the plane of said cutter unit wheeled-chassis and foot rests carried on the extremities of said brackets and disposed in planes extending at acute angles to the plane of said cutter unit wheeled-chassis and below the plane thereof.

References Cited in the file of this patent
UNITED STATES PATENTS

| | | |
|---|---|---|
| 1,153,692 | Kardell | Sept. 14, 1915 |
| 1,763,542 | Schoenberg et al. | June 10, 1930 |
| 2,192,468 | Gore | Mar. 5, 1940 |
| 2,263,081 | Fulton | Nov. 18, 1941 |
| 2,625,230 | Burkhardt | Jan. 13, 1953 |
| 2,657,621 | Kantz | Nov. 3, 1953 |